Jan. 8, 1924.
J. G. OGDEN
1,480,101
DENTAL FLOSS APPLIANCE
Filed March 22, 1922
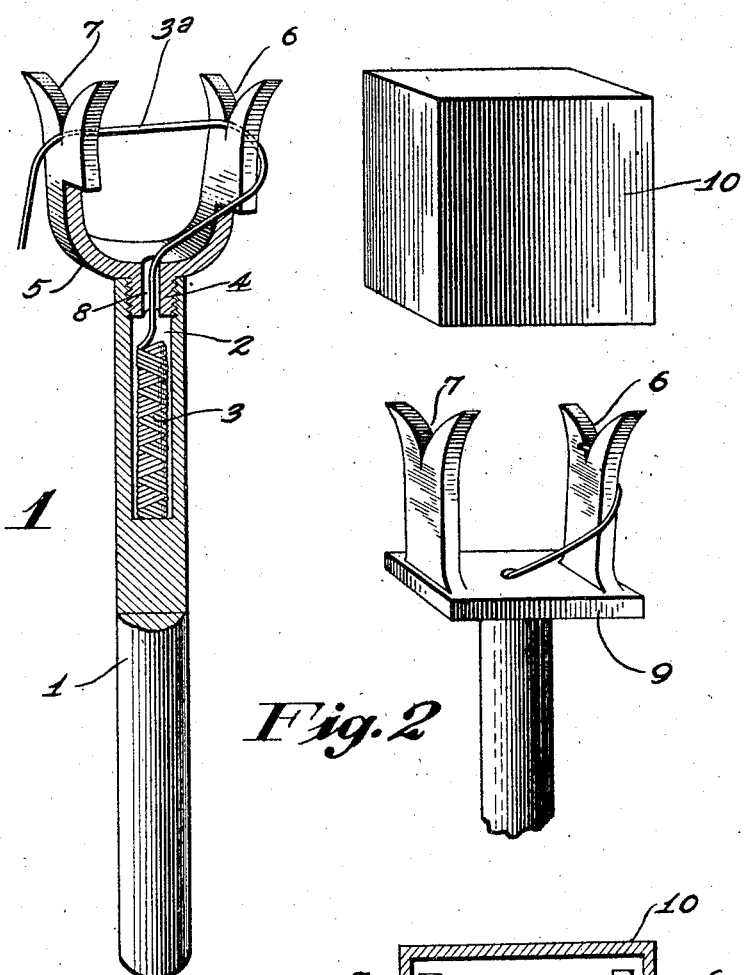
INVENTOR.
John G. Ogden
BY Jas. H. Griffin
ATTORNEYS.

Patented Jan. 8, 1924.

1,480,101

UNITED STATES PATENT OFFICE.

JOHN G. OGDEN, OF PLAINFIELD, NEW JERSEY.

DENTAL FLOSS APPLIANCE.

Application filed March 22, 1922. Serial No. 545,708.

*To all whom it may concern:*

Be it known that I, JOHN G. OGDEN, a citizen of the United States, residing at Plainfield, county of Union, and State of New Jersey, have invented a new and useful Dental Floss Appliance, of which the following is a specification.

This invention is an appliance adapted to hold a length of dental floss in taut condition and provided with a handle to facilitate the manipulation of the floss in such manner as to obviate the necessity of introducing one's fingers into the mouth.

Devices of this general character have been heretofore suggested, but they are more or less complicated and expensive to manufacture.

The object of the present invention in contradistinction is to provide an appliance of unusual simplicity, one which is thoroughly sanitary and highly efficient in the carrying out of its intended purposes.

A notable feature of the structure of the present invention is that the floss is held in taut condition without the employment of moving or adjustable parts and in this manner I obtain maximum simplicity and economy in manufacture and at the same time a construction so formed as to leave no inaccessible cracks, crevices or other places where dirt, impurities or germs may accumulate and render the structure unsanitary.

In its preferred practical form, the appliance of this invention embodies a handle recessed to receive and house a bolt of dental floss, which is adapted to be withdrawn as needed and stretched across a yoke rigidly mounted on the handle. The arms of the yoke are bifurcated by forming in the free ends thereof tapering slots in the bases of which slots the floss may be wedged in such manner as to clamp it tightly in position in order that it may be maintained in taut condition. Either one or both of the edges of these slots may be more or less sharp to facilitate the breaking away of used portions of the thread.

I may if so desired associate with the yoke a cap or cover, so as to entirely conceal the yoke and house the parts thereof which come into contact with the mouth when the device is not in use, so that the appliance may be carried in the pocket without becoming contaminated.

Features of the invention, other than those adverted to, will be apparent from the hereinafter detailed description and claims, when read in conjunction with the accompanying drawings.

The accompanying drawings illustrate different practical embodiments of the invention, but the constructions shown are to be understood as illustrative, only, and not as defining the limits of the invention.

Figure 1 is a perspective view of a dental floss appliance embodying the present invention, a portion of said appliance being shown in central section in the interest of clearness and said appliance being greatly enlarged in the interest of clearness.

Figure 2 is a fragmental perspective view of a slightly modified form of appliance embodying the present invention, illustrating a cover or cap which may be associated with the yoke of the appliance to cover and conceal the same when not in use; and, Figure 3 is a section of the structure shown in Figure 2 with the cap or cover in place.

The preferred form of the present invention is shown in Figure 1 of the drawings. It embodies a handle 1, one end of which is provided with a chamber or recess 2, adapted to contain a ball or roll of dental floss 3. The open end of the chamber 2 is threaded and is adapted to receive a threaded shank 4 of a yoke 5. The yoke is substantially U-shaped in configuration and the free ends of the arms thereof are provided with V-shaped slots 6 and 7, said slots tapering in the direction toward the base of the yoke. A small hole or passage 8 leads through the base of the yoke and longitudinally through the shank 4 thereof, so that floss from the ball 3 may be threaded through the hole 8 into accessible position. When it is desired to use the implement for the cleaning of the teeth, a portion of the floss is drawn through the hole 8, passed about one of the arms of the yoke and the floss is then pulled firmly into the base of the slot 6 so as to clamp it tightly in position at this point. The free end of the floss is then pulled taut and said floss is drawn firmly into the base of the slot 7 and wedged tightly thereinto, so as to hold that portion 3ª of the floss which extends across the yoke in taut condition. The implement is now in condition for operation and may be employed to carry out its functions in a ready and convenient manner.

After the teeth have been cleaned and before laying the implement aside, the floss is disengaged from the slot 7 by drawing it upwardly out of the slot and is thereafter drawn more tightly than before into the base of the slot 6, the edges of which slot may be slightly sharpened adjacent the base, so as to effect a cutting of the used portion of the floss free from the unused portion thereof. When the used portion of the floss is cut or broken free in the manner described, the free end of the unused floss will remain firmly wedged in the base of the slot 6 and will be maintained in such position until it is manually pulled free at such time as it is desired to use the implement again. At such time, the operations described are repeated.

In Figures 2 and 3, I have illustrated a slightly modified form of the invention, wherein the principle and mode of operation are the same as in the construction of Figure 1, but in the construction of Figures 2 and 3 I have shown the base of the yoke as in the form of a plate 9, which may be of any desired contour, but is illustrated as rectangular in shape. The base 9 is made of such size that a cover or cap 10 may, when the device is not in use, be slipped down over the yoke and grip the edges of said plate in such manner as to entirely conceal and house the upper portions of the yoke, whereby the device may be carried in the pocket without danger of contamination. When it is desired to use the device, the cover or cap 10 may be slipped off, but at all other times the cap is adapted to remain in position to cover and conceal all those parts of the device which come in contact with the mouth and thereby maintain such parts clean and sanitary. Figure 2 shows the cover removed, while Figure 3 shows the cover in position on the yoke.

It will of course be understood that while the appliance as shown in the drawing is rather large and bulky, that in practice the device is made relatively small and may be readily carried in a pocket without unduly encumbering the same. Moreover, in the drawings I have shown the slots 6 and 7 in the arms rather large in order that their function as wedge shaped gripping means may be readily understood. However, in practice, these jaws are made much smaller than is shown and practically all edges of the device are rounded over, except possibly the bases of the slots, so that there will be no possibility of the cutting of the mouth.

The appliance of this invention entirely obviates the use of fixed and movable clamping jaws or extraneous means such as cleats, in which saliva or foreign matter are apt to accumulate and render such devices unsanitary. The present appliance is free from all moving parts and is unusually simple in construction and economical to manufacture. Moreover, the appliance is economically used as there is no waste or loss of floss and it is moreover easily manipulated, since after the floss has been initially threaded through the hole 8, further threading thereof is not necessary.

In the foregoing detail description of the invention and in the accompanying drawings, I have illustrated the preferred practical form of my invention, wherein the handle is recessed or chambered to house the dental floss which is adapted to be withdrawn through a suitable hole or aperture and stretched across the slotted end of the yoke for ready use.

I am aware however that many of the advantages of this invention may be obtained without, necessarily, housing the floss to be used within the chamber or handle. In fact, it is within the purview of this invention to make the handle solid or in any other convenient form and to carry the floss in a separate or independent container such for example on the spool which such floss is usually wrapped and sold in the drug stores and other places. When using the invention in this way, a suitable length of floss is unrolled from the spool, broken free therefrom and stretched across the slotted ends of the yoke for the purpose of holding or maintaining the broken away portion of the floss in taut and operative condition upon the yoke. For these reasons and others which will be apparent to those skilled in the art, it is apparent that the invention is not restricted to the specific showing of the drawings and that while changes may be made such for example as slight changes in shape without departing from this invention which is to be understood as broadly novel as is commensurate with the appended claims.

Having thus fully described the invention, what I claim as new and desire to secure by Letters Patent is:

1. A dental floss appliance embodying a handle provided interiorly with a chamber adapted to contain a supply of dental floss, a yoke associated with the open end of said chamber and having a co-axial opening, the free ends of the arms of said yoke having tapering V-shaped slots with constricted places in which the end of the floss after passing through said opening may be stretched across said yoke and held taut in said slots by frictional engagement solely therein.

2. A dental floss appliance embodying a handle provided interiorly with a chamber adapted to contain a supply of dental floss, and a yoke associated with the open end of said chamber and having a co-axial opening, the free ends of the arms of the yoke having tapering V-shaped slots with constructed places in which the end of the floss after passing through said opening may be stretched across said yoke and held taut in said slots by frictional engagement solely, said yoke having a threaded portion surrounding said opening and detachably engaged in the open end of said chamber.

In testimony whereof I have signed the foregoing specification.

JOHN G. OGDEN.